(12) United States Patent
Lea et al.

(10) Patent No.: US 12,063,704 B2
(45) Date of Patent: Aug. 13, 2024

(54) ACCESSORY DEVICE COMMUNICATION UTILIZING HOST-SYNCHRONIZED TRANSMISSION

(71) Applicant: Microsoft Technology Licensing, LLC, Redmond, WA (US)

(72) Inventors: Perry Victor Lea, Eagle, ID (US); Krishna Kant Chintalapudi, Redmond, WA (US); Steven William Ranta, Seattle, WA (US); Gopala Srihari Narlanka, Bellevue, WA (US); Stanley William Adermann, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 17/480,817

(22) Filed: Sep. 21, 2021

(65) Prior Publication Data

US 2023/0091057 A1     Mar. 23, 2023

(51) Int. Cl.
*H04W 76/19*     (2018.01)
*G06F 3/06*     (2006.01)
(Continued)

(52) U.S. Cl.
CPC .......... *H04W 76/19* (2018.02); *G06F 3/0604* (2013.01); *G06F 3/0655* (2013.01);
(Continued)

(58) Field of Classification Search
CPC ..... H04W 76/19; H04W 72/04; G06F 3/0604; G06F 3/0655; G06F 3/0679; G06F 3/162; H04L 5/0053
See application file for complete search history.

(56) References Cited

U.S. PATENT DOCUMENTS

2007/0080933 A1   4/2007  Chen et al.
2009/0122006 A1   5/2009  Nielsen et al.
(Continued)

FOREIGN PATENT DOCUMENTS

WO        2014190100 A1      11/2014
WO   WO-2018049045 A1 *      3/2018    ........... H04L 1/0001
WO   WO-2020096969 A1 *      5/2020    ........... H04L 1/0001

OTHER PUBLICATIONS

"International Search Report and Written Opinion Issued in PCT Application No. PCT/US22/041285", Mailed Date: Feb. 20, 2023, 18 Pages.

(Continued)

*Primary Examiner* — Charles C Jiang
*Assistant Examiner* — Debebe A Asefa
(74) *Attorney, Agent, or Firm* — Rainier Patents, P.S.

(57) ABSTRACT

A host device includes a processor, a wireless communication device in data communication with the processor, and a hardware storage device in data communication with the processor. The hardware storage device has instructions stored thereon that, when executed by the processor, cause the host device to establish a wireless data channel with an accessory device and assign the wireless data channel to a resource unit with a bandwidth less than 20 MHz. The instructions further cause the host device to send a trigger signal to the accessory device and receive state data from the accessory device in response to the trigger signal.

20 Claims, 8 Drawing Sheets

(51) Int. Cl.
*G06F 3/16* (2006.01)
*H04L 5/00* (2006.01)
*H04W 72/04* (2023.01)

(52) U.S. Cl.
CPC ............ *G06F 3/0679* (2013.01); *G06F 3/162* (2013.01); *H04L 5/0053* (2013.01); *H04W 72/04* (2013.01)

(56) References Cited

U.S. PATENT DOCUMENTS

| | | |
|---|---|---|
| 2015/0312738 A1 | 10/2015 | Deich et al. |
| 2016/0119770 A1 | 4/2016 | Ryu et al. |
| 2016/0255620 A1 | 9/2016 | Li et al. |
| 2016/0374070 A1 | 12/2016 | Ghosh |
| 2017/0142201 A1 | 5/2017 | Holmes |
| 2019/0274171 A1 | 9/2019 | Viger et al. |
| 2021/0236917 A1 | 8/2021 | Palmer et al. |
| 2023/0090035 A1 | 3/2023 | Lea et al. |
| 2023/0123467 A1 | 4/2023 | Lea et al. |

OTHER PUBLICATIONS

"Non Final Office Action Issued in U.S. Appl. No. 17/502,957", Mailed Date: Jun. 8, 2023, 9 Pages.

"Non Final Office Action Issued in U.S. Appl. No. 17/479,521", Mailed Date: Mar. 31, 2023, 12 Pages.

U.S. Appl. No. 17/479,521, filed Sep. 20, 2021.

U.S. Appl. No. 17/502,957, filed Oct. 15, 2021.

"Final Office Action Issued in U.S. Appl. No. 17/479,521", Mailed Date: Sep. 14, 2023, 14 Pages.

Ali, et al., "Design of MAC Layer Resource Allocation Schemes for IEEE 802.11ax: Future Directions", In Conference of IETE Technical Review, 35(1), Jun. 8, 2017, pp. 1-26.

Kim, Suhwook, "Performance evaluation of deterministic service for EHT—Follow up", Retrieved from https://mentor.ieee.org/802.11/dcn/19/11-19-1888-00-00be-performance-evaluation-of-deterministic-service-for-eht-follow-up.pptx, Nov. 11, 2019, pp. 1-24.

"Invitation to Pay Additional Fee Issued in PCT Application No. PCT/US22/041285", Mailed Date: Dec. 14, 2022, 10 Pages.

"International Search Report and Written Opinion Issued in PCT Application No. PCT/US22/041431", Mailed Date: Dec. 7, 2022, 11 Pages.

"International Search Report and Written Opinion Issued in PCT Application No. PCT/US22/044778", Mailed Date: Jan. 9, 2023, 17 Pages.

Notice of Allowance mailed on Feb. 2, 2024, in U.S. Appl. No. 17/479,521, 9 pages.

Corrected Notice of Allowability mailed on May 2, 2024, in U.S. Appl. No. 17/479,521, 7 pages.

\* cited by examiner

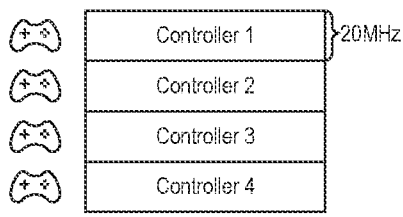 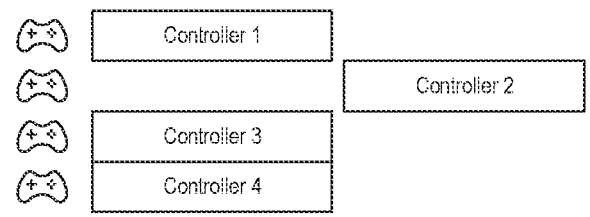
FIG. 7-1    FIG. 7-2
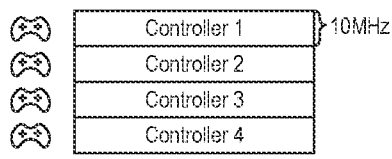 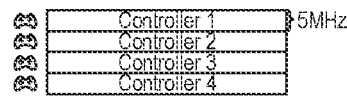
FIG. 7-3    FIG. 7-4

ACCESSORY DEVICE COMMUNICATION UTILIZING HOST-SYNCHRONIZED TRANSMISSION

BACKGROUND

Background and Relevant Art

Accessory devices communicate with a host device to send and receive information from a host application. Multiple accessory devices can allow multiple users to interact with the host device at the same time. When multiple accessory devices communicate with the host device, delays and interference can occur.

BRIEF SUMMARY

In some embodiments, a host device includes a processor, a wireless communication device in data communication with the processor, and a hardware storage device in data communication with the processor. The hardware storage device has instructions stored thereon that, when executed by the processor, cause the host device to establish a wireless data channel with an accessory device and assign the wireless data channel to a resource unit with a bandwidth less than 20 MHz. The instructions further cause the host device to send a trigger signal to the accessory device and receive state data from the accessory device in response to the trigger signal.

In some embodiments, a method of managing a wireless communication between an accessory device and a host device includes, at the host device, establishing a wireless data channel with an accessory device, assigning the wireless data channel to a resource unit with a bandwidth less than 20 MHz, sending a trigger signal to the accessory device, and receiving state data from the accessory device in response to the trigger signal.

In some embodiments, a method of managing wireless communication between a plurality of accessory devices and a host device includes, at the host device, establishing a first wireless data channel with a first accessory device, establishing a second wireless data channel with a second accessory device, assigning the first wireless data channel to at least a first resource unit with a bandwidth less than 20 MHz, assigning the second wireless data channel to at least a second resource unit with a bandwidth less than 20 MHz, sending a trigger signal to the first accessory device and second accessory device simultaneously, and receiving a first response signal from the first accessory device and a second response signal from the second accessory device simultaneously in response to the trigger signal.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 6-1 and FIG. 6-2 illustrate different communication timings, according to at least some embodiments of the present disclosure;

FIG. 7-1 through 7-4 illustrate an example of resource unit allocation, according to at least some embodiments of the present disclosure;

DETAILED DESCRIPTION

The present disclosure generally relates to systems and methods for communicating data between one or more accessory devices and a host device. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

Figure 1:
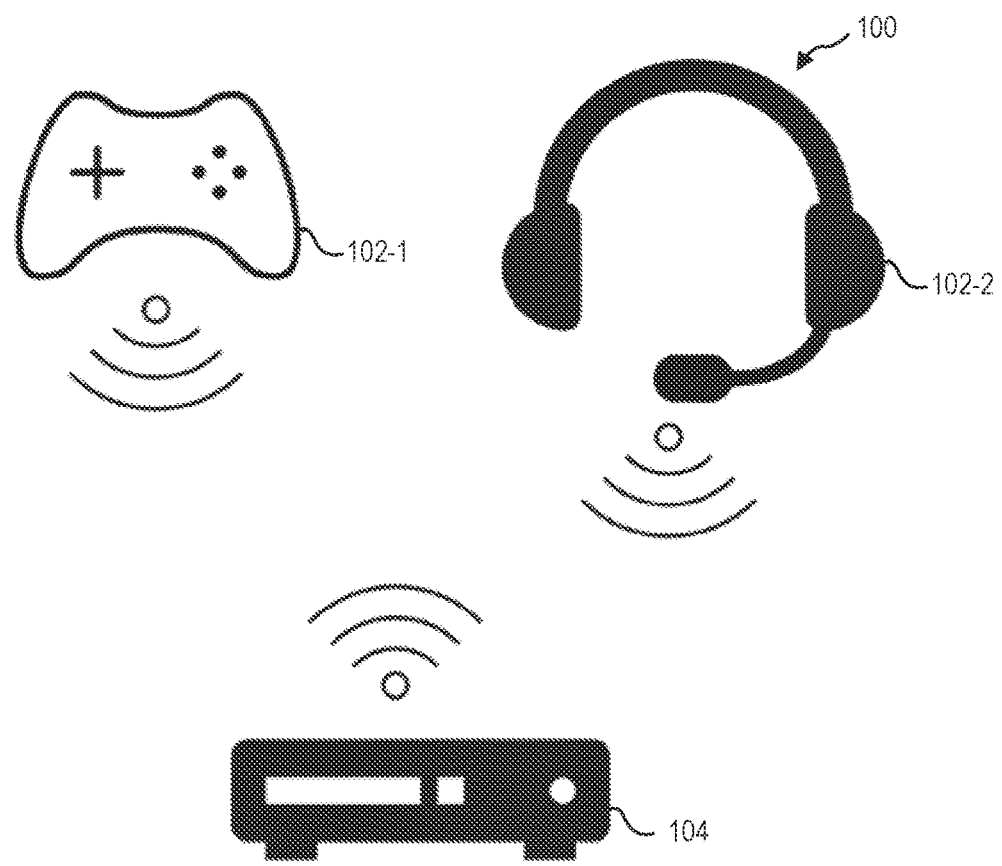
FIG. 1 is a schematic representation of a wireless communication system, according to at least some embodiments of the present disclosure.

FIG. 1 illustrates an example system 100 of accessory devices 102-1, 102-2 communicating with a host device 104. The accessory device 102-1, 102-2 may be configured to wirelessly communicate with a plurality of host devices 104 using different communication methods and stored data channel personalities for those different communication methods. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device 202 includes a processor 206 in communication with a hardware storage device 208. The hardware storage device 208 can be any non-transient computer readable medium that may store instructions thereon. The hardware storage device 208 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 208 includes instruction stored thereon that, when executed by the processor 206, cause the accessory device 202 to perform any method or part of a method described herein. The hardware storage device 208 or another hardware storage device has, stored thereon, at least one data channel personality.

The accessory device 202 further includes a wireless communication device 210, such as a 802.11 ax radio frequency (RF) transceiver, that allows wireless transmission and receipt of data to the host device and/or control device. In some embodiments, the accessory device 202 has a plurality of wireless communication devices 210 that provide communication at different frequencies or power levels to communicate with different host devices and/or control devices.

The data channel provides communication of state data, audio data, and other frequent communications between the accessory device 202 and a host device. In some embodiments, the accessory device 202 also communicates via a control channel with a control application that provides instructions to the accessory device to change data channel personality. In some embodiments, the control channel may broadcast other device information to the control application, such as current or available stored data channel personalities, current battery status of the accessory device 202, RSSI signal strength, or other functions. In some embodiments, the accessory device has at least one input mechanism 212 locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

Figure 3:
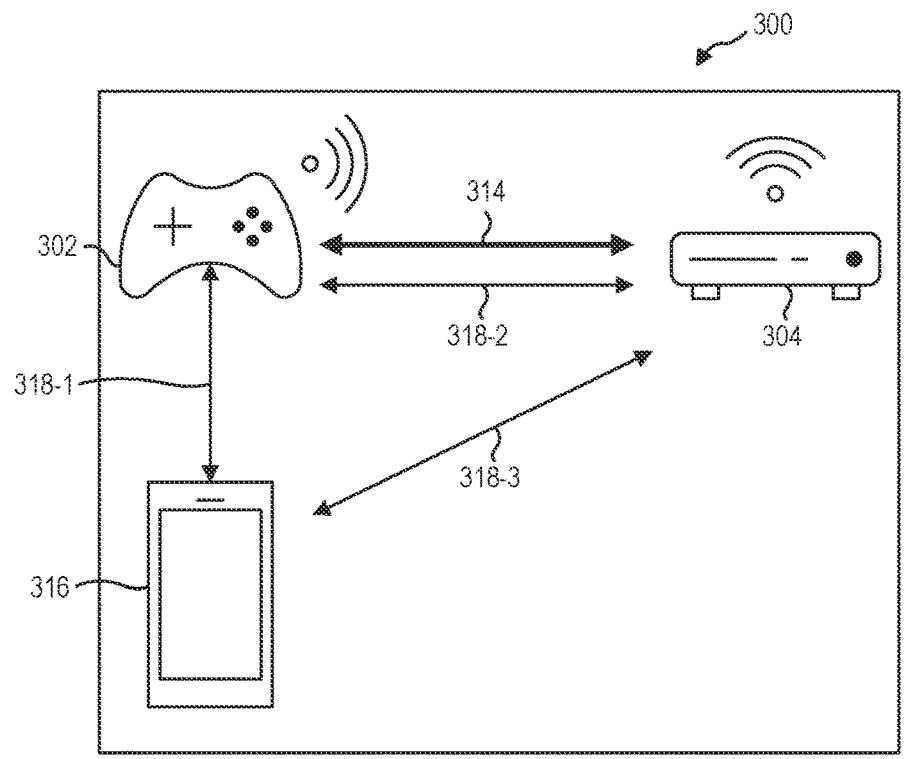
FIG. 3 is a schematic representation of wireless communication channels, according to at least some embodiments of the present disclosure.

Referring now to FIG. 3, in some embodiments, a system 300 includes an accessory device 302 in communication with a host device 304 by a data channel 314 and with a control device 316 via a first control channel 318-1. Other control channels 318-2, 318-3 may further allow device information to be communicated or shared between devices of the system 300 to allow latency-critical information to be sent via the data channel 314 with the least interference and/or delay possible. For example, a second control channel 318-2 between the accessory device 302 and the host device 304 may allow communication of device health and device status information between the accessory device 302 and the host device 304. A third control channel 318-3 between the control device 316 and the host device 304 may allow communication of device health and device status information between the control device 316 and the host device 304.

A data channel 314 includes real-time or substantially real-time communication between the accessory device 302 and the host device 304 to allow a user to interact with a host application executed by the host device 304, such as a game application running on a game console (e.g., MICROSOFT XBOX, SONY PLAYSTATION, NINTENDO SWITCH). The host application may be natively executed on the host device 304. The host application may be a streamed game application executed on a cloud server and accessed through an access point (the host device) to which the accessory device has a data channel. For example, a game controller may transmit controller state data to the host device 304 via the data channel 314 to interact with a game application running on or accessed through the host device 304. In other examples, a headset may receive audio data from the host device 304 via the data channel 314 to represent the sounds in a game environment. In yet other examples, a game controller with a headset connected thereto may transmit chat audio data from the headset through the game controller to the host device 304 via the data channel 314. In some embodiments, the data channel 314 allows for transmission of data between the accessory device 302 and host device 304 at least every 2 milliseconds.

A control channel 318-1, 318-2, 318-3 may allow non-latency-critical information to be transmitted between the accessory device 302 and a control application or device 316. In some embodiments, the control device 316 is different from the host device. For example, a control device 316 may be a user's smartphone that communicates with the accessory device 302 via the control channel 318-1 while the accessory device 302 communicates with a host device 304, such as a game console, via the data channel 314. In some embodiments, the control device 316 is the host device 304, and a control application is different from the host application with which the accessory device 302 communicates via the data channel 314. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

Figure 4:
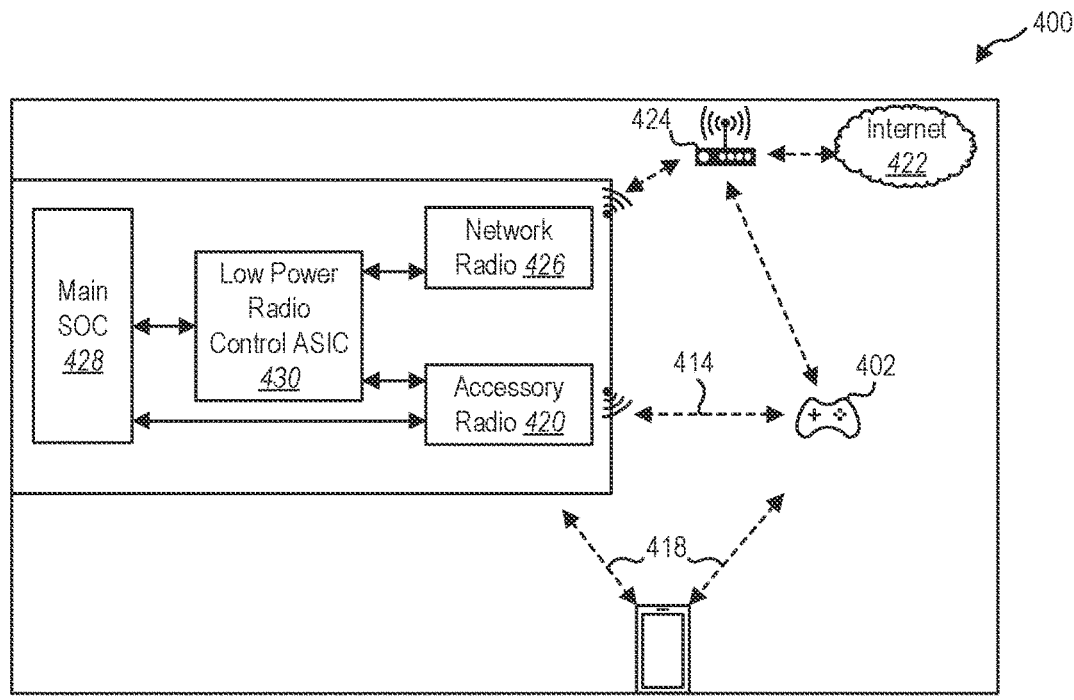
FIG. 4 is a system diagram of a host device and accessory device; according to at least some embodiments of the present disclosure.

Referring now to FIG. 4, an embodiment of a system 400 is illustrated with a host device 404 (e.g., a game console) in communication with an accessory device 402 via an accessory radio 420. The host device 404 is also in data communication with a network 422 through an access point 424 via a network radio 426. A main processor or main SOC 428 of the host device 404 is indirectly connected to the network radio 426 and accessory radio 420 on the through Peripheral Component Interconnect Express (PCIe) or another hardware connection standard.

The Low Power Radio Control ASIC 430 is a device that provides a PCIe pass-through using a non-transparent bridge topology when operating normally. In a low power state (e.g., regulatory-standby), the main SOC 428 will be powered off and network control will be managed by the low power radio control ASIC 430. In this state, the PCIe link will not be used as a pass-through to the main SOC 428, rather the low power radio control ASIC 430 will manage all network connectivity. The low power radio control ASIC 430 may manage wake events and filter network traffic while also ensuring network functionality is maintained. The low power radio control ASIC 430 may use a processor and embedded SRAM or other memory to host enough of the network functionality to respond to certain events and wake the main SOC 428. During a low power mode, the accessory radio 420 may not be managed by the low power radio control ASIC 430. Waking a console in a low power state from the accessory device 402 will rely on the accessory radio 420 responding to a wake signal or beacon from the accessory device 402 and then alerting the main SOC 428 via an in-band or out-of-band signal 432 to wake.

In some embodiments, the host device 402 establishes a data channel 414 between the accessory device 402 (and wireless communication device thereof) and the accessory radio 420 of the host device 404. In some embodiments, a control channel 418 is also established using the accessory radio 420. The data channel 414 carries latency-sensitive information between the accessory device 402 and the host device 404 to provide the user with responsive and immersive interaction with a host application running on (or accessed through) the host device 404. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel 414 can therefor cause inputs to be received after the intended state of the game environment. In a particular example, a 30 ms delay in communicating a user input can cause the user input to arrive at the host device 404 two to three frames after the button is pressed by the user.

In conventional systems using time multiplexing, additional devices using the frequencies of the data channel 414 can cause traffic or congestion on the data channel 414 that slows the transmission of the data. For example, multiple accessory devices sharing the bandwidth for data channels with the accessory radio 420 can cause additional delays. In other examples, devices or radios broadcasting on the same frequency that are not part of the system 400 can cause additional delays in communication.

Figure 5:
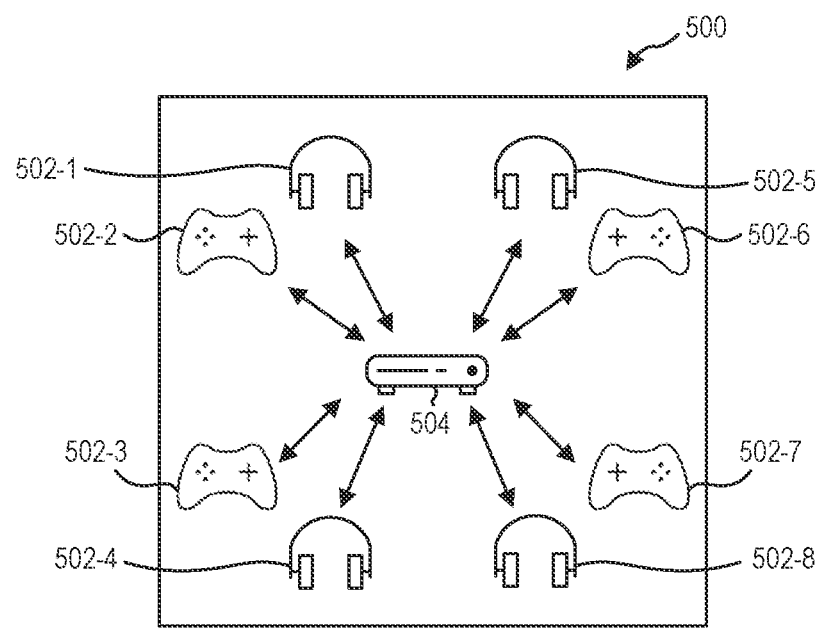
FIG. 5 is a network topology diagram, according to at least some embodiments of the present disclosure.

FIG. 5 illustrates an embodiment of a hub-spoke model for network topology. A hub-spoke model for a system 500 requires the establishment of a different data channel for each accessory device 502-1, 502-2, 502-3, 502-4, 502-5, 502-6, 502-7, 502-8 with the host device 504. In other embodiments, a mesh type network allows an accessory device to act as a node relay to another accessory device (such as a game controller acting as a node relay to a headset). A mesh introduces latency and complications in mesh routing, mesh security, and mesh reliability. A mesh also complicates predictable and sustained bandwidth quality of service. However, a hub-spoke model introduces many individual data channels to communicate with the host device 504. A game console may communicate with up to 8 accessory devices 502-1, 502-2, 502-3, 502-4, 502-5, 502-6, 502-7, 502-8 located in a small area in the example of local or "couch" multiplayer events. In such examples, conventional time-based multiplexing or wait-to-talk communication can introduce delays, which increase with the quantity of accessory devices sharing the frequencies.

Figure 2:
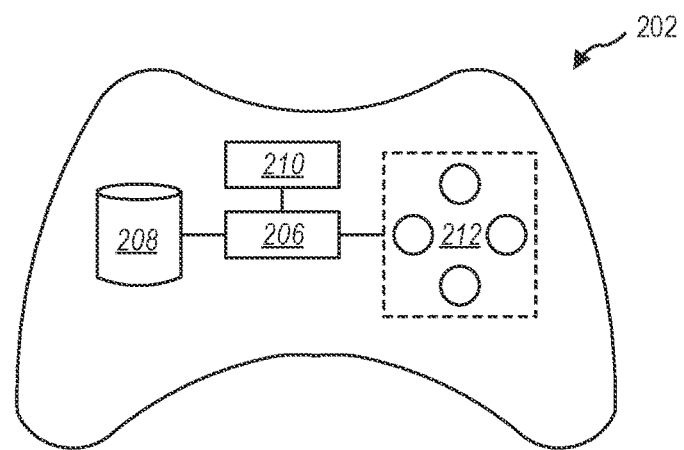
FIG. 2 is a schematic representation of an accessory device, according to at least some embodiments of the present disclosure.
Figures 1, 6:
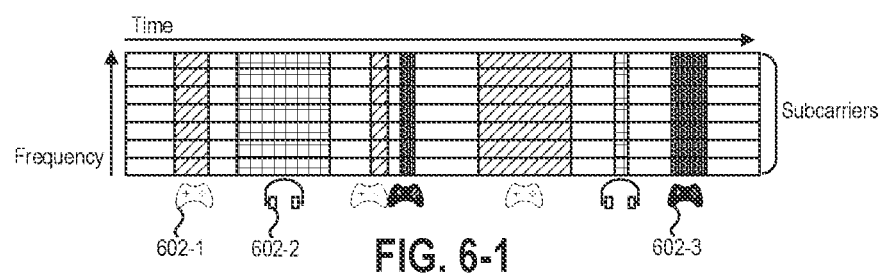
Figures 2, 6:
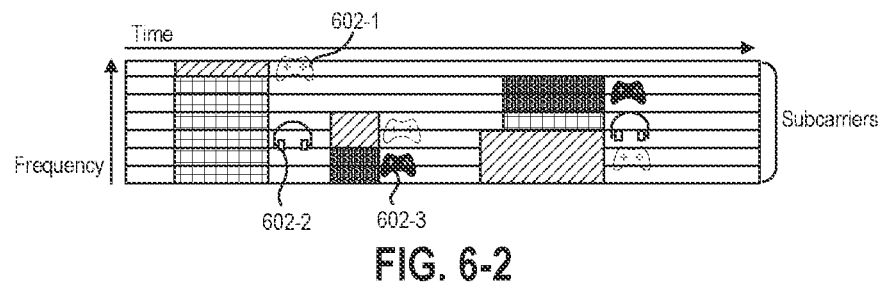

FIG. 6-1 illustrates an example of time-based multiplexing where each of the accessory devices 602-1, 602-2, 602-3 communicates with a host device at a different time from all other accessory devices. Each accessory device, therefor, must wait to transmit on the data channel the latency-sensitive information regarding audio and/or user inputs. Conversely, FIG. 6-2 illustrates an example of the same accessory devices 602-1, 602-2, 602-3 communicating with the host device freely without delay by dividing and assigning the available bandwidth into a plurality of subcarriers or resource units (RUs) that allow each accessory device 602-1, 602-2, 602-3 to transmit on a subcarrier simultaneously with another accessory device. For example, the first accessory device 602-1 can transmit analog state data of the position of an analog stick simultaneously with a second accessory device 602-2 transmitting audio data. The first accessory device 602-1 and third accessory device 602-3 subsequently transmit digital button state data simultaneously. In contrast to a conventional sequential transmission of state data, both players using the first accessory device 602-1 and third accessory device 602-3 transmit data simultaneously. When playing a competitive game, the sequential transmission of data can create a systemic advantage or disadvantage for a particular player.

In some embodiments, equal bandwidth or quantity of subcarriers is allocated to each accessory device. In other embodiments, the amount of bandwidth or quantity of subcarriers can be different between accessory devices based at least partially on the type of accessory device and/or type of data being transmitted. For example, in FIG. 6-2, the first accessory device 602-1 is allocating a single subcarrier to broadcast state data of the game controller buttons while the second accessory device 602-2 is allocated six subcarriers to communicate audio information from a headset. In some embodiments, the allocated subcarrier(s) is fixed for at least one of the accessory devices 602-1, 602-2, 602-3. In some embodiments, the allocated subcarriers are dynamically allocated based on the type of data being communicated. For example, the second accessory device 602-2 is initially allocated six subcarriers to receive game audio from the host device, while the second accessory device 602-2 is later allocated a single subcarrier to broadcast lower quality chat audio from the second accessory device 602-2 to the host device.

Orthogonal Frequency Division Multiple Access (OFDMA) can improve controller latency and overall coexistence issues when enabled. OFDMA allows multiple users or accessory devices to share spectrum efficiently. Whereas legacy Orthogonal Frequency Division Multiplexing (OFDM) techniques used in Wi-Fi 5 and other Wi-Fi standard protocols used time-division multiplexing of frequency space and consumed the entire channel capacity for a single accessory device, OFDMA will localize individual transmissions into different subcarriers or RUs for simultaneous transmission of all data.

To address the systemic advantage or disadvantage for a particular player created by OFDM, some systems time-stamp the user input when the user presses a button (or the position of an analog stick or trigger is measured) and all inputs are delayed until all transmissions are received. However, delaying all inputs at the host device to process the inputs together forces a greater perceived input lag by the user because all inputs are further delayed from the frame at which the user input the button press. In other words, the more controllers sending inputs to the game console, the more delayed the inputs feel to the players. To encourage and support local multiplayer and the social environment it creates, game performance and input response time should be as fast as possible while being as fair and simultaneous as possible.

Conventionally, OFDMA allows multiple devices to communicate over a particular bandwidth with less regard for the transmission timing of the other devices. For example, each device could transmit and/or receive data on a designated subcarrier or RU in the bandwidth at any time without contending with other devices. However, instantaneous preparation and transmission of data (e.g., state data, audio data) from the controller adversely affects battery life. Systems and methods according to the present disclosure use OFDMA to force synchronization between the accessory devices by establishing a uniform and simultaneous communication timing at the host device. This can provide users with a more consistent and fairer gameplay experience.

In some embodiments, the host device is responsible for assigning each accessory device a set of subcarriers used. The 802.11n/ac OFDM physical layer specification (PHY) specifies the width of each subcarrier at 312.5 kHz. A 20 MHz channel is comprised of 64 subcarriers with 52 carrying data, 4 pilots, and 8 guard bands (null). OFDMA reduces the subcarrier width to 78.125 KHz with 256 subcarriers in a 20 MHz channel. Those subcarriers are divided up as: 234 for data, 8 pilots, 3 direct current, and 11 guard bands.

These subcarriers or RUs range from 26 subcarriers (or tones) to 2×996 tones depending on the channel width. In some embodiments, controller hardware limits the design to 20 MHz channels. In some embodiments, controller hardware limits the total channel capacity to 114.7 Mb/s because the hardware may only allow for 256 QAM (not 1024 QAM).

In some embodiments, a controller or other accessory device is based on the 20 MHz channel width. However, other embodiments may handle larger channel width including a 160 MHz width. The RUs are dependent on the number of client accessories or STAs attached.

FIG. 7-1 through FIG. 7-4 illustrates an example of dividing channels into subchannels. In some embodiments, an accessory radio supports a full 80 MHz of channel bandwidth while the controllers may only support 20 Mhz channels. This means up to four controllers or accessories can share the contiguous 80 MHz bandwidth as illustrated in FIG. 7-1.

While FIG. 7-1 illustrates an optimal use case, there may still be events where collisions occur, and contention exists in the channel or subchannel(s). FIG. 7-2 is an example of three of the four 20 MHz subchannels experiencing clear airspace and functioning without collisions or contention. Controller 1, Controller 3, and Controller 4 transmit simultaneously in response to a trigger signal, while Controller 2 contends for space on the second subchannel. Controller 2 transmits at the next available time. While this strategy allocates the largest available channel capacity both on the console radio and controller radios, it creates equal and fair experiences for only some of the players. When there is contention, various backoff strategies can be incorporated, such as the host device renegotiating a 40 MHz channel into four 10 MHz subchannels, as illustrated in FIG. 7-3. While only using half of the available bandwidth of the accessory radio in the host device, each accessory device (e.g., controller) is allocated equal bandwidth in an available frequency. Similarly, FIG. 7-4 illustrates yet another example of further division of channels to allocate 5 MHz subchannels to each of the four controllers.

Figure 8:
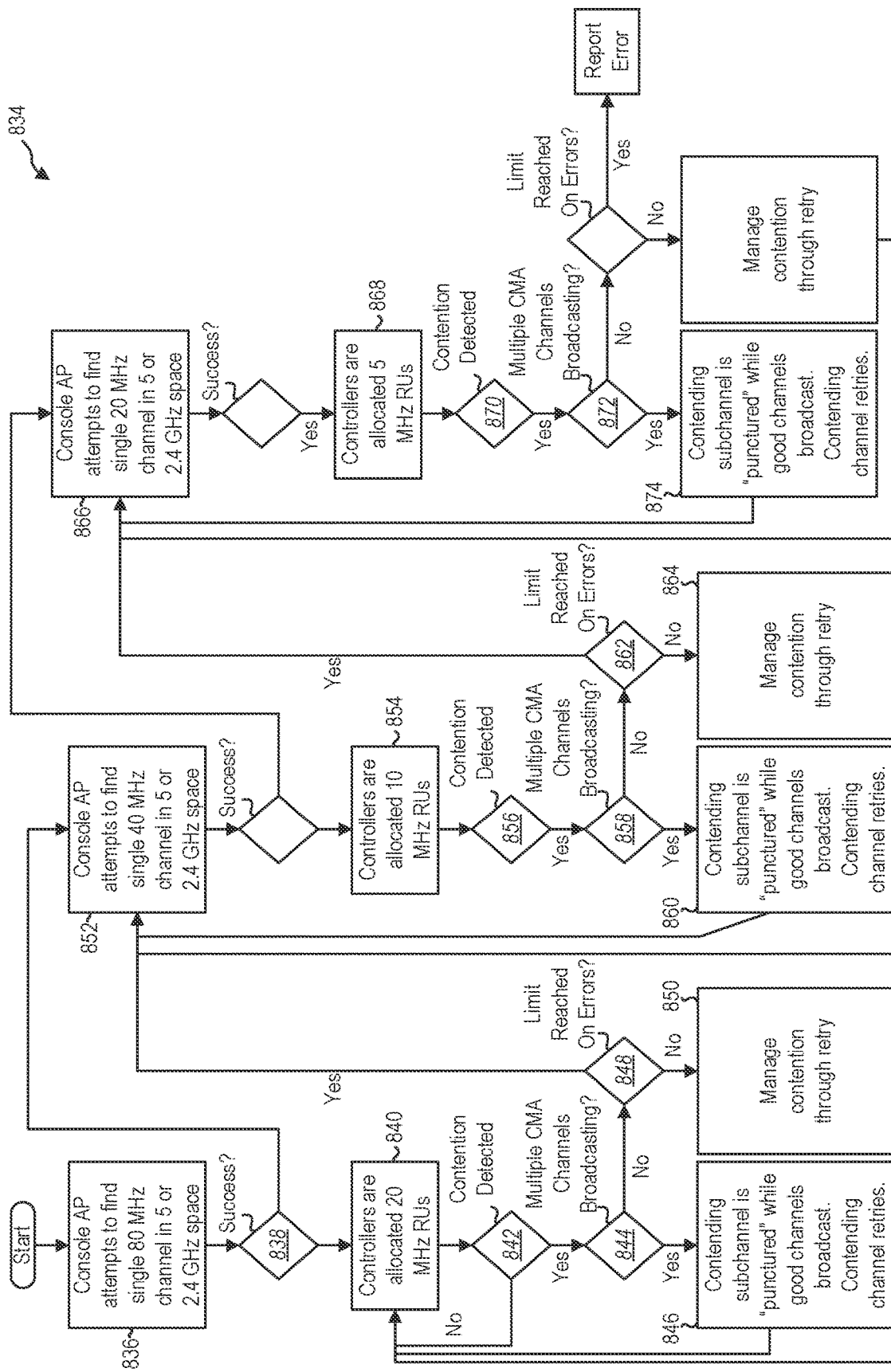
FIG. 8 is a flowchart illustrating a method of backing off a data channel allocation, according to at least some embodiments of the present disclosure.

A flowchart of the process by which the host device employs such a back off strategy is illustrated in FIG. 8. The method of backing off from a wider channel (20 MHz) may be based on factors of channel contention, drop outs, retries, and lost packets.

The method 834 includes the host device attempting to find an available (e.g., without detected traffic thereon) a single 80 MHz channel in either 2.4 GHz or 5 GHz space at 836. If the host device is successful in finding an available 80 MHz channel, the method 834 includes allocating 20 MHz subchannels or RUs to up to four accessory devices at 840. So long as no contention is detected or experienced at 842, the controllers remain allocated to the 20 MHz subchannels in the 80 MHz space. When a contention is detected at 842, the method 834 includes determining whether multiple subchannels are able to broadcast without contention at 844. If multiple subchannels are able to broadcast, the method 834 includes allowing the non-contending subchannels to transmit data through simultaneous transmission while the contending subchannel(s) is punctured and retries at a later time at 846.

In some embodiments, the accessory devices remain using the allocated 20 MHz subchannels until other subchannels are unable to broadcast simultaneously at 848. When a limit is reached on the number of attempts, the method 834 may include retrying the 20 MHz allocation at 850 or the method 834 may proceed by having the host device attempt to find a single 40 MHz channel in either 2.4 GHz or 5 GHz space at 852. If the host device is successful in finding an available 40 MHz channel, the method 834 includes allocating 10 MHz subchannels or RUs to up to four accessory devices at 854. So long as no contention is detected or experienced at 856, the controllers remain allocated to the 10 MHz subchannels in the 40 MHz space. When a contention is detected at 856, the method 834 includes determining whether multiple subchannels are able to broadcast without contention at 858. If multiple subchannels are able to broadcast, the method 834 includes allowing the non-contending subchannels to transmit data through simultaneous transmission while the contending subchannel(s) is punctured and retries at a later time at 860.

In some embodiments, the accessory devices remain using the allocated 10 MHz subchannels until other subchannels are unable to broadcast simultaneously at 862. When a limit is reached on the number of attempts, the method 834 may include retrying the 10 MHz allocation at 864 or the method 834 may proceed by having the host device attempt to find a single 20 MHz channel in either 2.4 GHz or 5 GHz space at 866. If the host device is successful in finding an available 20 MHz channel, the method 834 includes allocating 5 MHz subchannels or RUs to up to four accessory devices at 868. So long as no contention is detected or experienced at 870, the controllers remain allocated to the 10 MHz subchannels in the 40 MHz space. When a contention is detected at 870, the method 834 includes determining whether multiple subchannels are able to broadcast without contention at 872. If multiple subchannels are able to broadcast, the method 834 includes allowing the non-contending subchannels to transmit data through simultaneous transmission while the contending subchannel(s) is punctured and retries at a later time at 874.

Figure 9:
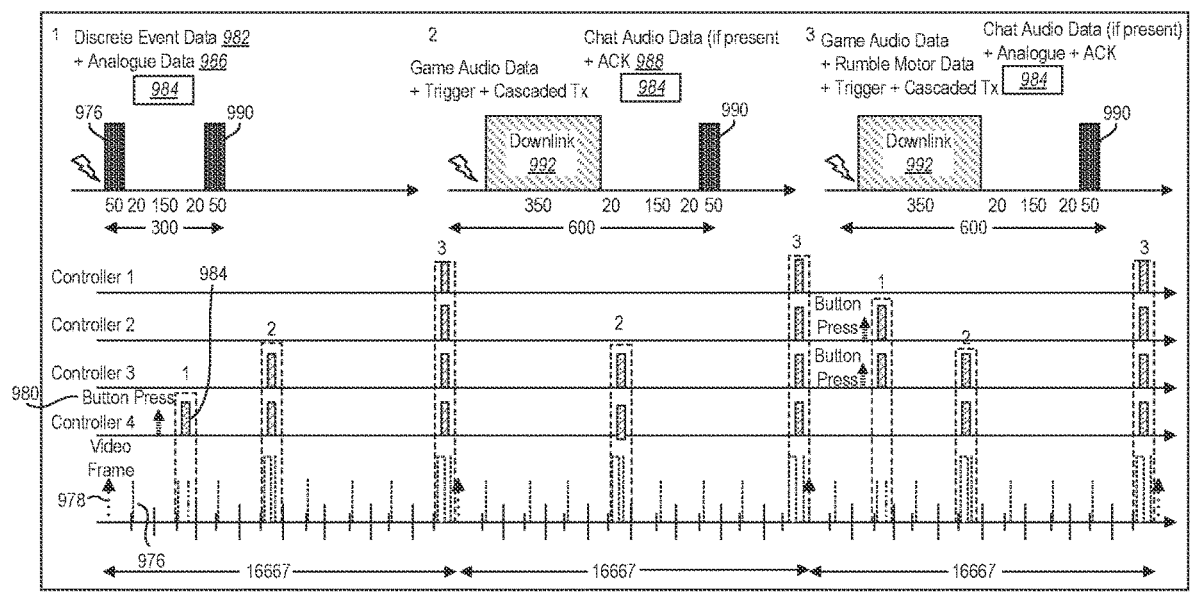
FIG. 9 is a timing chart illustrating accessory device communication with a host device, according to at least some embodiments of the present disclosure.

FIG. 9 is a timing chart illustrating an embodiment of communication timing for a plurality of accessory devices with a host device. The accessory device transmissions are illustrated inline with the device designation, and the host device transmissions are illustrated in the bottom line for reference to the accessory device transmissions. In some embodiments, the host device serves as the trigger of OFDMA synchronization. For example, the host device may send a trigger signal 976 or trigger frame to the accessory device(s) that triggers and synchronizes the response from the accessory device(s). In some embodiments, the trigger signal is provided every 2 ms. In some embodiments, the timing or interval of the trigger signals is based at least partially on the timing or interval between video frames 978, as will be described in more detail in relation to FIG. 10.

In some embodiments, the trigger signal 976 provides two benefits. The trigger signal 976 synchronizes response transmissions from the accessory devices such that all accessory devices transmit user inputs and state data simultaneously for fair and immersive gameplay. In some embodiments, the accessory device can at least partially sleep between trigger signals 976, allowing the Wi-Fi-based communication to draw less power, extending wireless battery runtime. For example, at least some of the processing capability or device storage may sleep between trigger signals 976. In the embodiment illustrated in FIG. 9, the frame time is 16.667 ms and trigger signals 976 are transmitted by the host device at approximately 2 ms intervals between video frames 978.

A discrete input event 980 from the user, such as a digital button press, may be received by the input buttons of the accessory device. The discrete event data 982 associated with the discrete input event 980 is cached and transmitted in a response signal 984 including one or more packets in response to the next trigger signal 976 received. In some embodiments, a plurality of discrete input events 980 are received between trigger frames 976 and the discrete event data 982 transmitted in the response signal 984 includes the data from the plurality of discrete input events 980. In some embodiments, the discrete input event 980 is timestamped in the discrete event data 982 to ensure the discrete event data 982 reflects an order of inputs to the accessory device. For example, while the illustrated embodiment in FIG. 9 has a 2 ms interval between trigger frames 976, a longer interval, such as 35 ms, allows time for multiple discrete input events 980. In such examples, the order of discrete input events 980 may alter the meaning of the user inputs for the host device and/or host application, such as motion commands used in the fighting game genre. In other embodiments, the discrete input events 980 may be transmitted in the response signal 984 without timestamps, approximating a simultaneous input of the discrete input events 980 input by the user in the interval of trigger signals 976. For example, a sequence of discrete input events 980 that occur within a 2 ms time period may be reasonably considered to have been intended to be simultaneous inputs by the user. As such, timestamping the discrete input events 980 within each response signal 984 may be unnecessary beyond the timestamp of the response signal 984.

In some embodiments, a response signal 984 includes other state data from the accessory device. For example, the accessory device may transmit one or more packets of state data related to analog data 986 representing the position and/or state of an analog input mechanism (e.g., analog thumbstick, analog trigger, rotary dial) of the accessory device. In some embodiments, the response signal 984 includes chat audio data 988 received by the accessory device to be broadcast to the host device. The host device, after receiving the response signal 984 may transmit an acknowledgement signal 990 confirming receipt.

While discrete input events 980 and analog measurements have been described as being transmitted upon receipt of the next trigger frame 976, other more latency-tolerant communications may occur between the host device and accessory devices at a different interval. For example, a downlink transmission 992 from the host device to the accessory device containing game audio data and/or haptic data (e.g., rumble motor data) may transmit at a greater interval than the trigger signal interval. In the illustrated embodiment in FIG. 9, the audio downlink interval is approximately 8 ms, and the haptic downlink interval is approximately the video frame timing. In some embodiments, a downlink interval is greater than the trigger signal interval. In some embodiments, a downlink interval is a multiple of the trigger signal interval. The downlink may include the trigger signal. The downlink transmission may end at the trigger signal interval, maintaining the communication timing.

More specifically, each event described is illustrated in FIG. 9. Event 1 is a digital button input. In some examples, a trigger or digital input button generates an event on the controller that causes it to wake and prepare one or more packets for transmission. In this case, data will be aggregated for transmission such as multiple buttons that have been debounced and registered. In the first Event 1 illustrated in FIG. 9, OFDMA subchannel communication may not be used, as a single controller generates the event. In other embodiments, OFDMA subchannel communication can be used for upstream data with multiple controllers as shown in the second Event 1 later in the diagram.

Event 2 is an Audio input and output with controller state data. In this example, game audio data sent downstream to the controller is explicit and previously scheduled based on an 8 ms audio downlink interval. The host device will send a trigger signal and subsequently deliver four channels of game audio data to each accessory device. The downlink transmission utilizes OFDMA subchannel communication, and data is sent in parallel. The trigger frame is combined and aggregated with the game audio data to preserve additional bandwidth. Chat audio data from the headsets will be sent immediately after the downstream data is delivered with any discrete event data prepared in the previous trigger signal interval.

Event 3 includes haptic data and game audio data sent to controllers. In this example, haptic data is sent every 33.334 ms. This implies that game audio data sent downstream to the accessory device is sent one half the downlink interval as haptic data. The haptic data will be aggregated with audio data and sent during that 33.334 ms period.

Figure 10:
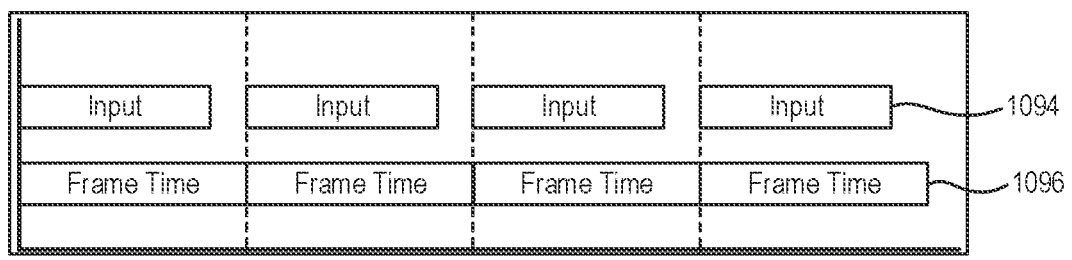
FIG. 10 is a timing chart illustrating Dynamic Latency Input timing, according to at least some embodiments of the present disclosure.

In some embodiments, the accessory device communication timing is dynamic based on the video frame timing. DLI is a method to support dynamic latency adjustments to align controller transmission to video frames. Rather than send all data as soon as it is available from a controller (such as a discrete input event), transmission data is sent only on negotiated intervals determined between the accessory device and host device. Sending data immediately could effectively reduce battery life by 75% to 80%. An example DLI timing is illustrated in FIG. 10.

DLI allows the user input 1094 to be aligned with the rendering of the video frame in the frame time 1096. DLI includes timestamping the input when the discrete event data is received to send only as much input as necessary. As the user can only react or respond to the information in a single frame at a time, and the host device can only render the game environment one frame at a time, in some embodiments, sending multiple user inputs 1094 to the host device within a single frame time 1096 is superfluous.

To accomplish this, DLI allows the host device to fine-tune arrival events from an accessory device based on video frame timing. The accessory devices also timestamp all discrete input events based on the accessory device clock. When the host device sees input from the accessory device, the host device can determine what the accessory device's internal clock value is relative to the video frame. The host device can then request that the accessory device target a specific frame timing and adjust its next report timing forward or backward as needed. The host can also evaluate the transmit timestamps to determine whether the input arrived late because it was sent late or because of some other interference and make allowances.

In some embodiments, the communication timing can be adjusted proactively based on frame timing by collecting data regarding frame timing in certain conditions or portions of a game application. For example, some portions of a game may be expected to render at a known frame time (such as 30 FPS for cutscenes and 60 FPS for interactive gameplay) or during known or measured slowdown during memory transitions. For example, some game applications may experience a reduction in FPS and an associated increase in frame time when the player moves from one contiguous portion of the game environment to another. The changing of cached information in the system memory can create a predictable event where the host device can proactively alter the communication timing. In some embodiments, the host device can use or be in communication with another computing device that uses a machine learning model to learn from known variations in frame time to predict when a frame time change will occur.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

INDUSTRIAL APPLICABILITY

The present disclosure generally relates to systems and methods for communicating data between one or more accessory devices and a host device. The accessory device is an electronic device that communicates data with the host devices through a wireless communication. A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data from the host device, which may be subsequently generated for the user by the accessory device.

In some embodiments, a system includes accessory devices communicating with a host device. The accessory device may be configured to wirelessly communicate with a plurality of host devices using different communication methods and stored data channel personalities for those different communication methods. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the accessory device to perform any method or part of a method described herein. The hardware storage device 208 or another hardware storage device has, stored thereon, at least one data channel personality.

The accessory device further includes a wireless communication device, such as a 802.11 ax radio frequency (RF) transceiver, that allows wireless transmission and receipt of data to the host device and/or control device. In some embodiments, the accessory device has a plurality of wireless communication devices that provide communication at different frequencies or power levels to communicate with different host devices and/or control devices.

The data channel provides communication of state data, audio data, and other frequent communications between the accessory device and a host device. In some embodiments, the accessory device also communicates via a control channel with a control application that provides instructions to the accessory device to change data channel personality. In some embodiments, the control channel may broadcast other device information to the control application, such as current or available stored data channel personalities, current battery status of the accessory device, RSSI signal strength, or other functions. In some embodiments, the accessory device has at least one input mechanism locally on the accessory device to select, cycle through, or otherwise change the data channel personality. In embodiments with a control channel, the control channel allows for the communication of latency-tolerant data transmission, while the data channel handles latency-critical information. As the data channel handles latency-critical information, additional accessory devices sharing the bandwidth may create delays in transmission due to time multiplexing.

In some embodiments, a system includes an accessory device in communication with a host device by a data channel and with a control device via a first control channel. Other control channels may further allow device information to be communicated or shared between devices of the system to allow latency-critical information to be sent via the data channel with the least interference and/or delay possible. For example, a second control channel between the accessory device and the host device may allow communication of device health and device status information between the accessory device and the host device. A third control channel between the control device and the host device may allow communication of device health and device status information between the control device and the host device.

A data channel includes real-time or substantially real-time communication between the accessory device and the host device to allow a user to interact with a host application executed by the host device, such as a game application running on a game console (e.g., MICROSOFT XBOX, SONY PLAYSTATION, NINTENDO SWITCH). The host application may be natively executed on the host device 304. The host application may be a streamed game application executed on a cloud server and accessed through an access point (the host device) to which the accessory device has a data channel. For example, a game controller may transmit controller state data to the host device via the data channel to interact with a game application running on or accessed through the host device. In other examples, a headset may receive audio data from the host device via the data channel to represent the sounds in a game environment. In yet other examples, a game controller with a headset connected thereto may transmit chat audio data from the headset through the game controller to the host device via the data channel. In some embodiments, the data channel allows for transmission of data between the accessory device and host device at least every 2 milliseconds (ms).

A control channel may allow non-latency-critical information to be transmitted between the accessory device and a control application or device. In some embodiments, the control device is different from the host device. For example, a control device may be a user's smartphone that communicates with the accessory device via the control channel while the accessory device communicates with a host device, such as a game console, via the data channel. In some embodiments, the control device is the host device, and a control application is different from the host application with which the accessory device communicates via the data channel. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In some embodiments, a system includes a host device (e.g., a game console) in communication with an accessory device via an accessory radio. The host device is also in data communication with a network through an access point via a network radio. A main processor or main SOC of the host device is indirectly connected to the network radio and accessory radio on the through Peripheral Component Interconnect Express (PCIe) or another hardware connection standard.

The Low Power Radio Control ASIC is a device that provides a PCIe pass-through using a non-transparent bridge topology when operating normally. In a low power state (e.g., regulatory-standby), the main SOC will be powered off and network control will be managed by the low power radio control ASIC. In this state, the PCIe link will not be used as a pass-through to the main SOC, rather the low power radio control ASIC will manage all network connectivity. The low power radio control ASIC may manage wake events and filter network traffic while also ensuring network functionality is maintained. The low power radio control ASIC may use a processor and embedded SRAM or other memory to host enough of the network functionality to respond to certain events and wake the main SOC. During a low power mode, the accessory radio may not be managed by the low power radio control ASIC. Waking a console in a low power state from the accessory device will rely on the accessory radio responding to a wake signal or beacon from the accessory device and then alerting the main SOC via an in-band or out-of-band signal to wake.

In some embodiments, the host device establishes a data channel between the accessory device (and wireless communication device thereof) and the accessory radio of the host device. In some embodiments, a control channel is also established using the accessory radio. The data channel carries latency-sensitive information between the accessory device and the host device to provide the user with responsive and immersive interaction with a host application running on (or accessed through) the host device. For example, some game consoles or personal computers can render game applications and the game environments thereof at framerate at or above 120 frames per second (FPS). In such examples, each frame lasts only 8.33 milliseconds (ms). In another example, a game environment rendered at 60 FPS has a 16.67 ms frame time. Delays in communications over the data channel can therefor cause inputs to be received after the intended state of the game environment. In a particular example, a 30 ms delay in communicating a user input can cause the user input to arrive at the host device two to three frames after the button is pressed by the user.

In conventional systems using time multiplexing, additional devices using the frequencies of the data channel can cause traffic or congestion on the data channel that slows the transmission of the data. For example, multiple accessory devices sharing the bandwidth for data channels with the accessory radio can cause additional delays. In other examples, devices or radios broadcasting on the same frequency that are not part of the system can cause additional delays in communication.

A hub-spoke network topology for a system requires the establishment of a different data channel for each accessory device with the host device. In other embodiments, a mesh type network allows an accessory device to act as a node relay to another accessory device (such as a game controller acting as a node relay to a headset). A mesh introduces latency and complications in mesh routing, mesh security, and mesh reliability. A mesh also complicates predictable and sustained bandwidth quality of service. However, a hub-spoke model introduces many individual data channels to communicate with the host device. A game console may communicate with up to eight accessory devices located in a small area in the example of local or "couch" multiplayer events. In such examples, conventional time-based multiplexing or wait-to-talk communication can introduce delays, which increase with the quantity of accessory devices sharing the frequencies.

In some examples, time-based multiplexing causes accessory devices to communicate with a host device at a different time from all other accessory devices. Each accessory device, therefor, must wait to transmit on the data channel the latency-sensitive information regarding audio and/or user inputs. Conversely, the same accessory devices may communicate with the host device freely without delay by dividing and assigning the available bandwidth into a plurality of subcarriers or resource units (RUs) that allow each accessory device to transmit on a subcarrier simultaneously with another accessory device. For example, the first accessory device can transmit analog state data of the position of an analog stick simultaneously with a second accessory device transmitting audio data. The first accessory device and third accessory device subsequently transmit digital button state data simultaneously. In contrast to a conventional sequential transmission of state data, both players using the first accessory device and third accessory device transmit data simultaneously. When playing a competitive game, the sequential transmission of data can create a systemic advantage or disadvantage for a particular player.

In some embodiments, equal bandwidth or quantity of subcarriers is allocated to each accessory device. In other embodiments, the amount of bandwidth or quantity of subcarriers can be different between accessory devices based at least partially on the type of accessory device and/or type of data being transmitted. For example, the first accessory device and/or host device may allocate a single subcarrier to broadcast state data of the game controller buttons while the second accessory device is allocated six subcarriers to communicate audio information from a headset. In some embodiments, the allocated subcarrier(s) is fixed for at least one of the accessory devices. In some embodiments, the allocated subcarriers are dynamically allocated based on the type of data being communicated. For example, the second accessory device is initially allocated six subcarriers to receive game audio from the host device, while the second accessory device is later allocated a single subcarrier to broadcast lower quality chat audio from the second accessory device to the host device.

Orthogonal Frequency Division Multiple Access (OFDMA) can improve controller latency and overall coexistence issues when enabled. OFDMA allows multiple users or accessory devices to share spectrum efficiently. Whereas Orthogonal Frequency Division Multiplexing (OFDM) techniques used in Wi-Fi 5 and other Wi-Fi standard protocols used time-division multiplexing of frequency space and consumed the entire channel capacity for a single accessory device, OFDMA will localize individual transmissions into different subcarriers or RUs for simultaneous transmission of all data.

To address the systemic advantage or disadvantage for a particular player created by OFDM, some systems time-stamp the user input when the user presses a button (or the position of an analog stick or trigger is measured) and all inputs are delayed until all transmissions are received. However, delaying all inputs at the host device to process the inputs together forces a greater perceived input lag by the user because all inputs are further delayed from the frame at which the user input the button press. In other words, the more controllers sending inputs to the game console, the more delayed the inputs feel to the players. To encourage and support local multiplayer and the social environment it creates, game performance and input response time should be as fast as possible while being as fair and simultaneous as possible.

Conventionally, OFDMA allows multiple devices to communicate over a particular bandwidth with less regard for the transmission timing of the other devices. For example, each device could transmit and/or receive data on a designated subcarrier or RU in the bandwidth at any time without contending with other devices. However, instantaneous preparation and transmission of data (e.g., state data, audio data) from the controller adversely affects battery life. Systems and methods according to the present disclosure use OFDMA to force synchronization between the accessory devices by establishing a uniform and simultaneous communication timing at the host device. This can provide users with a more consistent and fairer gameplay experience.

In some embodiments, the host device is responsible for assigning each accessory device a set of subcarriers used. The 802.11n/ac OFDM physical layer specification (PHY) specifies the width of each subcarrier at 312.5 kHz. A 20 MHz channel is comprised of 64 subcarriers with 52 carrying data, 4 pilots, and 8 guard bands (null). OFDMA reduces the subcarrier width to 78.125 KHz with 256 subcarriers in a 20 MHz channel. Those subcarriers are divided up as: 234 for data, 8 pilots, 3 direct current, and 11 guard bands.

These subcarriers or RUs range from 26 subcarriers (or tones) to 2×996 tones depending on the channel width. In some embodiments, controller hardware limits the design to 20 MHz channels. In some embodiments, controller hardware limits the total channel capacity to 114.7 Mb/s because the hardware may only allow for 256 QAM (not 1024 QAM).

In some embodiments, a controller or other accessory device is based on the 20 MHz channel width. However, other embodiments may handle larger channel width including a 160 MHz width. The RUs are dependent on the number of client accessories or STAs attached.

In some embodiments, an accessory radio supports a full 80 MHz of channel bandwidth while the controllers may only support 20 Mhz channels. This means up to four controllers or accessories can share the contiguous 80 MHz bandwidth.

While this is an optimal use case, there may still be events where collisions occur, and contention exists in the channel or subchannel(s). For example, three of the four 20 MHz subchannels may experience clear airspace and functioning without collisions or contention. Controller 1, Controller 3, and Controller 4 transmit simultaneously in response to a trigger signal, while Controller 2 contends for space on the second subchannel. Controller 2 transmits at the next available time. While this strategy allocates the largest available channel capacity both on the console radio and controller radios, it creates equal and fair experiences for only some of the players. When there is contention, various backoff strategies can be incorporated, such as the host device renegotiating a 40 MHz channel into four 10 MHz subchannels. While only using half of the available bandwidth of the accessory radio in the host device, each accessory device (e.g., controller) is allocated equal bandwidth in an available frequency.

The method of backing off from a wider channel (20 MHz) may be based on factors of channel contention, drop outs, retries, and lost packets. In some embodiments, the method includes the host device attempting to find an available (e.g., without detected traffic thereon) a single 80 MHz channel in either 2.4 GHz or 5 GHz space. If the host device is successful in finding an available 80 MHz channel, the method includes allocating 20 MHz subchannels or RUs to up to four accessory devices. So long as no contention is detected or experienced, the controllers remain allocated to the 20 MHz subchannels in the 80 MHz space. When a contention is detected, the method includes determining whether multiple subchannels are able to broadcast without contention. If multiple subchannels are able to broadcast, the method includes allowing the non-contending subchannels to transmit data through simultaneous transmission while the contending subchannel(s) is punctured and retries at a later time.

In some embodiments, the accessory devices remain using the allocated 20 MHz subchannels until other subchannels are unable to broadcast simultaneously at 848. When a limit is reached on the number of attempts, the method may include retrying the 20 MHz allocation or the method may proceed by having the host device attempt to find a single 40 MHz channel in either 2.4 GHz or 5 GHz space. If the host device is successful in finding an available 40 MHz channel, the method includes allocating 10 MHz subchannels or RUs to up to four accessory devices. So long as no contention is detected or experienced, the controllers remain allocated to the 10 MHz subchannels in the 40 MHz space. When a contention is detected, the method includes determining whether multiple subchannels are able to broadcast without contention. If multiple subchannels are able to broadcast, the method includes allowing the non-contending subchannels to transmit data through simultaneous transmission while the contending subchannel(s) is punctured and retries at a later time.

In some embodiments, the accessory devices remain using the allocated 10 MHz subchannels until other subchannels are unable to broadcast simultaneously. When a limit is reached on the number of attempts, the method may include retrying the 10 MHz allocation or the method may proceed by having the host device attempt to find a single 20 MHz channel in either 2.4 GHz or 5 GHz space. If the host device is successful in finding an available 20 MHz channel, the method includes allocating 5 MHz subchannels or RUs to up to four accessory devices. So long as no contention is detected or experienced, the controllers remain allocated to the 10 MHz subchannels in the 40 MHz space. When a contention is detected, the method includes determining whether multiple subchannels are able to broadcast without contention. If multiple subchannels are able to broadcast, the method includes allowing the non-contending subchannels to transmit data through simultaneous transmission while the contending subchannel(s) is punctured and retries at a later time.

In some embodiments, the host device serves as the trigger of OFDMA synchronization. For example, the host device may send a trigger signal or trigger frame to the accessory device(s) that triggers and synchronizes the response from the accessory device(s). In some embodiments, the trigger signal is provided every 2 ms. In some embodiments, the timing or interval of the trigger signals is based at least partially on the timing or interval between video frames.

In some embodiments, the trigger signal provides two benefits. The trigger signal synchronizes response transmissions from the accessory devices such that all accessory devices transmit user inputs and state data simultaneously for fair and immersive gameplay. In some embodiments, the accessory device can at least partially sleep between trigger signals, allowing the Wi-Fi-based communication to draw less power, extending wireless battery runtime. For example, at least some of the processing capability or device storage may sleep between trigger signals. In some embodiments, the frame time is 16.667 ms and trigger signals are transmitted by the host device at approximately 2 ms intervals between video frames.

A discrete input event from the user, such as a digital button press, may be received by the input buttons of the accessory device. The discrete event data associated with the discrete input event is cached and transmitted in a response signal including one or more packets in response to the next trigger signal received. In some embodiments, a plurality of discrete input events are received between trigger frames and the discrete event data transmitted in the response signal includes the data from the plurality of discrete input events. In some embodiments, the discrete input event is timestamped in the discrete event data to ensure the discrete event data reflects an order of inputs to the accessory device. For example, a longer interval, such as 35 ms, allows time for multiple discrete input events. In such examples, the order of discrete input events may alter the meaning of the user inputs for the host device and/or host application, such as motion commands used in the fighting game genre. In other embodiments, the discrete input events may be transmitted in the response signal without timestamps, approximating a simultaneous input of the discrete input events input by the user in the interval of trigger signals. For example, a sequence of discrete input events that occur within a 2 ms time period may be reasonably considered to have been intended to be simultaneous inputs by the user. As such, timestamping the discrete input events within each response signal may be unnecessary beyond the timestamp of the response signal.

In some embodiments, a response signal includes other state data from the accessory device. For example, the accessory device may transmit one or more packets of state data related to analog data representing the position and/or state of an analog input mechanism (e.g., analog thumbstick, analog trigger, rotary dial) of the accessory device. In some embodiments, the response signal includes chat audio data received by the accessory device to be broadcast to the host device. The host device, after receiving the response signal may transmit an acknowledgement signal confirming receipt.

While discrete input events and analog measurements have been described as being transmitted upon receipt of the next trigger frame, other more latency-tolerant communications may occur between the host device and accessory devices at a different interval. For example, a downlink transmission from the host device to the accessory device containing game audio data and/or haptic data (e.g., rumble motor data) may transmit at a greater interval than the trigger signal interval. In some embodiments, the audio downlink interval is approximately 8 ms, and the haptic downlink interval is approximately the video frame timing. In some embodiments, a downlink interval is greater than the trigger signal interval. In some embodiments, a downlink interval is a multiple of the trigger signal interval. The downlink may include the trigger signal. The downlink transmission may end at the trigger signal interval, maintaining the communication timing.

In some embodiments, the accessory device communication timing is dynamic based on the video frame timing. Dynamic Latency Input (DLI) is a method to support dynamic latency adjustments to align controller transmission to video frames. Rather than send all data as soon as it is available from a controller (such as a discrete input event), transmission data is sent only on negotiated intervals determined between the accessory device and host device. Sending data immediately could effectively reduce battery life by 75% to 80%.

DLI allows the user input to be aligned with the rendering of the video frame in the frame time. DLI includes timestamping the input when the discrete event data is received to send only as much input as necessary. As the user can only react or respond to the information in a single frame at a time, and the host device can only render the game environment one frame at a time, in some embodiments, sending multiple user inputs to the host device within a single frame time is superfluous.

To accomplish this, DLI allows the host device to fine-tune arrival events from an accessory device based on video frame timing. The accessory devices also timestamp all discrete input events based on the accessory device clock. When the host device sees input from the accessory device, the host device can determine what the accessory device's internal clock value is relative to the video frame. The host device can then request that the accessory device target a specific frame timing and adjust its next report timing forward or backward as needed. The host device can also evaluate the transmit timestamps to determine whether the input arrived late because it was sent late or because of some other interference and make allowances.

In some embodiments, the communication timing can be adjusted proactively based on frame timing by collecting data regarding frame timing in certain conditions or portions of a game application. For example, some portions of a game may be expected to render at a known frame time (such as 30 FPS for cutscenes and 60 FPS for interactive gameplay) or during known or measured slowdown during memory transitions. For example, some game applications may experience a reduction in FPS and an associated increase in frame time when the player moves from one contiguous portion of the game environment to another. The changing of cached information in the system memory can create a predictable event where the host device can proactively alter the communication timing. In some embodiments, the host device can use or be in communication with another computing device that uses a machine learning model to learn from known variations in frame time to predict when a frame time change will occur.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

The present disclosure relates to systems and methods for communicating data between one or more accessory devices and a host device according to at least the examples provided in the sections below:

[A1] In some embodiments, a host device includes a processor, a wireless communication device in data communication with the processor, and a hardware storage device in data communication with the processor. The hardware storage device has instructions stored thereon that, when executed by the processor, cause the host device to establish a wireless data channel with an accessory device and assign the wireless data channel to a resource unit with a bandwidth less than 20 MHz. The instructions further cause the host device to send a trigger signal to the accessory device and receive state data from the accessory device in response to the trigger signal.

[A2] In some embodiments, the instructions of [A1] further include sending the trigger signal at a time period no more than 2 milliseconds.

[A3] In some embodiments, the systems of [A1] or [A2] include an accessory device. The accessory device includes a processor, a wireless communication device in data communication with the processor, and a hardware storage device in data communication with the processor. The hardware storage device has accessory instructions stored thereon that, when executed by the processor, cause the accessory device to record a user input to the accessory device, prepare one or more packets with the state data based at least partially on the user input, receive the trigger signal, and transmit the state data to the host device in response to receiving the trigger signal.

[A4] In some embodiments, the accessory instructions of [A3] include at least a portion of the accessory device entering a sleep mode after transmitting the state data.

[A5] In some embodiments, the accessory instructions of [A3] or [A4] further include recording a plurality of user inputs in a time interval before the trigger signal and batching the plurality of user inputs in the time interval in the packet.

[B1] In some embodiments, a method of managing a wireless communication between an accessory device and a host device includes, at the host device, establishing a wireless data channel with an accessory device, assigning the wireless data channel to a resource unit with a bandwidth less than 20 MHz, sending a trigger signal to the accessory device, and receiving state data from the accessory device in response to the trigger signal.

[B2] In some embodiments, the trigger signal of [B1] is sent at a time interval no more than 8 milliseconds.

[B3] In some embodiments, the trigger signal of [B1] is sent at a variable time interval.

[B4] In some embodiments, the host device of [B1] renders a video game environment, and the trigger signal is sent at a time interval based at least partially on a render frame rate of the host device.

[B5] In some embodiments, the trigger signal of any of [B1] through [B4] includes game audio data.

[C1] In some embodiments, a method of managing wireless communication between a plurality of accessory devices and a host device includes, at the host device, establishing a first wireless data channel with a first accessory device, establishing a second wireless data channel with a second accessory device, assigning the first wireless data channel to at least a first resource unit with a bandwidth less than 20 MHz, assigning the second wireless data channel to at least a second resource unit with a bandwidth less than 20 MHz, sending a trigger signal to the first accessory device and second accessory device simultaneously, and receiving a first response signal from the first accessory device and a second response signal from the second accessory device simultaneously in response to the trigger signal.

[C2] In some embodiments, the trigger signal of [C1] is part of a downlink transmission to both the first accessory device and the second accessory device including game audio data.

[C3] In some embodiments, the trigger signal of [C1] is part of a downlink transmission to both the first accessory device and the second accessory device including haptic data.

[C4] In some embodiments, the method of any of [C1] through [C3] further includes sending a game audio downlink to the accessory device at an audio interval greater than a trigger signal interval.

[C5] In some embodiments, at least one of the first response signal and second response signal of [C4] includes chat audio data in response to the game audio downlink.

[C6] In some embodiments, the method of any of [C1] through [C5] further includes detecting contention on at least one of the first wireless data channel and the second wireless data channel and puncturing the contending channel.

[C7] In some embodiments, the method of [C6] further includes re-establishing the first wireless data channel with the first accessory device, re-establishing the second wireless data channel with the second accessory device, assigning the first wireless data channel to a third resource unit with a bandwidth less than the first resource unit, and assigning the second wireless data channel to a fourth resource unit with a bandwidth less than the second resource unit.

[C8] In some embodiments, the third resource unit of [C7] is less than 10 MHz.

[C9] In some embodiments, the first data channel of any of [C1] through [C8] has a different bandwidth than the second data channel.

[C10] In some embodiments, at least one of the first response signal and the second response signal of any of [C1] through [C9] includes a discrete event data from a plurality of discrete input events.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:
   a host device including:
   a processor;
   a wireless communication device in data communication with the processor;
   a hardware storage device in data communication with the processor, the hardware storage device having instructions stored thereon that, when executed by the processor, cause the host device to:
      establish a wireless data channel with an accessory device;
      assign the wireless data channel to a resource unit with a bandwidth less than 20 MHz;
      send a trigger signal to the accessory device; and
      receive state data from the accessory device in response to the trigger signal.

2. The system of claim 1, wherein the instructions further include sending the trigger signal at a time period no more than 2 milliseconds.

3. The system of claim 1, further comprising the accessory device, wherein
   the accessory device includes:
   a processor;
   a wireless communication device in data communication with the processor; and
   a hardware storage device in data communication with the processor, the hardware storage device having accessory instructions stored thereon that, when executed by the processor, cause the accessory device to:

record a user input to the accessory device;
prepare one or more packets with the state data based at least partially on the user input;
receive the trigger signal; and
transmit the state data to the host device in response to receiving the trigger signal.

4. The system of claim 3, wherein the accessory instructions further include at least a portion of the accessory device entering a sleep mode after transmitting the state data.

5. The system of claim 3, wherein the accessory instructions further include recording a plurality of user inputs in a time interval before the trigger signal and batching the plurality of user inputs in the time interval in the packet.

6. A method of managing a wireless communication between an accessory device and a host device, the method including:
at the host device:
establishing a wireless data channel with an accessory device;
assigning the wireless data channel to a resource unit with a bandwidth less than 20 MHz;
sending a trigger signal to the accessory device; and
receiving state data from the accessory device in response to the trigger signal.

7. The method of claim 6, wherein the trigger signal is sent at time interval no more than 8 milliseconds.

8. The method of claim 6, wherein the trigger signal is sent at a variable time interval.

9. The method of claim 6, wherein the host device renders a video game environment, and the trigger signal is sent at a time interval based at least partially on a render frame rate of the host device.

10. The method of claim 6, wherein the trigger signal includes game audio data.

11. A method of managing wireless communication between a plurality of accessory devices and a host device, the method including:
at the host device:
establishing a first wireless data channel with a first accessory device;
establishing a second wireless data channel with a second accessory device;
assigning the first wireless data channel to at least a first resource unit with a bandwidth less than 20 MHz;
assigning the second wireless data channel to at least a second resource unit with a bandwidth less than 20 MHz;
sending a trigger signal to the first accessory device and second accessory device simultaneously; and
receiving a first response signal from the first accessory device and a second response signal from the second accessory device simultaneously in response to the trigger signal.

12. The method of claim 11, wherein the trigger signal is part of a downlink transmission to both the first accessory device and the second accessory device including game audio data.

13. The method of claim 11, wherein the trigger signal is part of a downlink transmission to both the first accessory device and the second accessory device including haptic data.

14. The method of claim 11, further comprising sending a game audio downlink to the accessory device at an audio interval greater than a trigger signal interval.

15. The method of claim 14, wherein at least one of the first response signal and second response signal includes chat audio data in response to the game audio downlink.

16. The method of claim 11, further comprising:
detecting contention on at least one of the first wireless data channel and the second wireless data channel, and puncturing the contending channel.

17. The method of claim 16, further comprising,
re-establishing the first wireless data channel with the first accessory device;
re-establishing the second wireless data channel with the second accessory device;
assigning the first wireless data channel to a third resource unit with a bandwidth less than the first resource unit; and
assigning the second wireless data channel to a fourth resource unit with a bandwidth less than the second resource unit.

18. The method of claim 17, wherein the third resource unit is less than 10 MHz.

19. The method of claim 11, wherein the first data channel has a different bandwidth than the second data channel.

20. The method of claim 11, wherein at least one of the first response signal and the second response signal includes a discrete event data from a plurality of discrete input events.

* * * * *